(12) United States Patent
Nichols

(10) Patent No.: US 9,939,306 B2
(45) Date of Patent: Apr. 10, 2018

(54) DEVICE AND METHOD FOR MEASURING THE DEPTH OF MEDIA

(71) Applicant: The University of Bradford, Yorkshire (GB)

(72) Inventor: Andrew Nichols, Yorkshire (GB)

(73) Assignee: The University of Bradford, Yorkshire (GB)

( * ) Notice: Subject to any disclaimer, the term of this patent is extended or adjusted under 35 U.S.C. 154(b) by 284 days.

(21) Appl. No.: 14/420,909

(22) PCT Filed: Aug. 16, 2013

(86) PCT No.: PCT/GB2013/052182
§ 371 (c)(1),
(2) Date: Feb. 11, 2015

(87) PCT Pub. No.: WO2014/027208
PCT Pub. Date: Feb. 20, 2014

(65) Prior Publication Data
US 2015/0204708 A1    Jul. 23, 2015

(30) Foreign Application Priority Data

Aug. 16, 2012 (GB) .................................. 1214658.5

(51) Int. Cl.
*G01F 23/00* (2006.01)
*G01F 23/24* (2006.01)
*G01F 23/26* (2006.01)

(52) U.S. Cl.
CPC .......... *G01F 23/0069* (2013.01); *G01F 23/24* (2013.01); *G01F 23/241* (2013.01);
(Continued)

(58) Field of Classification Search
CPC ...... G01F 23/24; G01F 23/241; G01F 23/242; G01F 23/0069; G01F 23/263; G01F 23/265; G01F 23/268; G01F 23/245
See application file for complete search history.

(56) References Cited

U.S. PATENT DOCUMENTS 3,184,970 A * 5/1965 McNelly ............... G01F 23/241
                                                        73/304 R
4,382,382 A    5/1983 Wang
(Continued)

FOREIGN PATENT DOCUMENTS

DE    3522616 A1    1/1987
EP    1811274 A1    7/2007
(Continued)

OTHER PUBLICATIONS

International Search Report and Written Opinion for corresponding PCT Application No. PCT/GB2013/052182, dated Mar. 24, 2014 (17 pgs.).
(Continued)

*Primary Examiner* — Paul West
*Assistant Examiner* — Xin Zhong
(74) *Attorney, Agent, or Firm* — Shumaker & Sieffert, P.A.

(57) ABSTRACT

This invention relates to a device and method for measuring the depth of water and sediment deposition in pipes, channels, overland flows and tidal beaches. Sediment deposition may be detrimental to flood control in sewer systems. The invention is specifically concerned with measuring an electrical property such as the conductivity or capacitance in different mediums and therefore quantifying the depths of the different mediums. The measurement of an electrical property such as conductance or capacitance of the medium may also indicate the nature of the medium such as sediment structure, water salinity, and the presence of pollutants. The
(Continued)

device includes an array of elongate, substantially mutually parallel electrodes each having a predetermined length, the lengths being incremented stepwise from a shortest electrode to a longest electrode. The device includes electronic circuitry to apply a potential difference across selected pairs of electrodes and to measure a resulting electrical property between each selected pair of electrodes, the measured electrical property providing an indication of a submersion depth of the pair of electrodes in the at least one medium.

13 Claims, 22 Drawing Sheets

(52) U.S. Cl.
CPC .......... *G01F 23/242* (2013.01); *G01F 23/245* (2013.01); *G01F 23/263* (2013.01); *G01F 23/265* (2013.01); *G01F 23/268* (2013.01)

(56) References Cited

U.S. PATENT DOCUMENTS

| | | | |
|---|---|---|---|
| 6,101,873 A * | 8/2000 | Kawakatsu | G01F 23/266 |
| | | | 73/304 C |
| 6,334,360 B1 | 1/2002 | Chen | |
| 2007/0079653 A1 | 4/2007 | Zuleta et al. | |
| 2007/0164751 A1 * | 7/2007 | Parachini | G01F 23/243 |
| | | | 324/557 |
| 2007/0180904 A1 | 8/2007 | Gao | |
| 2009/0301188 A1 * | 12/2009 | Calcote | G01F 23/265 |
| | | | 73/304 C |

FOREIGN PATENT DOCUMENTS

| | | |
|---|---|---|
| GB | 1203452 | 8/1970 |
| GB | 2017933 A | 10/1979 |
| JP | 55138615 A | 10/1980 |
| JP | 58009029 A | 1/1983 |
| JP | 58161856 A | 9/1983 |
| JP | 59100825 A | 6/1984 |
| JP | 59168322 A | 9/1984 |
| JP | 2085761 A | 3/1990 |
| JP | 4031718 A | 2/1992 |
| JP | 2003090753 A | 3/2003 |
| JP | 2007093456 A | 4/2007 |

OTHER PUBLICATIONS

Search Report for corresponding GB Application No. 1214658.5, dated Nov. 30, 2012 (20 pgs.).

Fryer et al.,, "A linear twin wire probe for measuring water waves," Journal of Physics E: Scientific Instruments, vol. 9, pp. 405-408, 1975.

* cited by examiner

|  | Test set A |  |  | Test set B |  |
| --- | --- | --- | --- | --- | --- |
| Test ID | Sediment depth (mm) | Water depth (mm) | Test ID | Sediment depth (mm) | Water depth (mm) |
| A1 | 0 | 0 | B1 | 30 | 70 |
| A2 | 0 | 10 | B2 | 30 | 90 |
| A3 | 0 | 20 | B3 | 30 | 110 |
| A4 | 0 | 30 | B4 | 50 | 90 |
| A5 | 0 | 40 | B5 | 50 | 110 |
| A6 | 0 | 50 | B6 | 70 | 110 |
| A7 | 0 | 60 |  |  |  |
| A8 | 0 | 70 |  |  |  |
| A9 | 0 | 80 |  |  |  |
| A10 | 0 | 90 |  |  |  |
| A11 | 0 | 100 |  |  |  |
| A12 | 0 | 110 |  |  |  |
| A13 | 0 | 115 |  |  |  |
| A14 | 0 | 120 |  |  |  |
| A15 | 0 | 125 |  |  |  |

Table 1: Test conditions

FIG. 20

| Probe # | 1 | 2 | 3 | 4 | 5 | 6 | 7 | 8 | 9 | 10 |
|---|---|---|---|---|---|---|---|---|---|---|
| Effective response depth (mm) | - | 120 | 104 | 88.6 | 72.8 | 57.5 | 41.9 | 26.5 | 10.9 | 0 |

Table 2: Effective response depths of each probe

| Test ID | Water level (mm) | Line intersection position (mm) |
|---|---|---|
| A3 | 20 | 19.58 |
| A5 | 40 | 39.68 |
| A7 | 60 | 59.82 |
| A9 | 80 | 80.36 |

Table 3: Water surface position measurement

FIG. 21

| Test ID | Sediment depth (mm) | Measured sediment depth (mm) | Water depth (mm) | Measured water depth (mm) |
|---|---|---|---|---|
| B1 | 30 | 29.68 | 70 | 70.44 |
| B2 | 30 | 30.30 | 90 | 89.43 |
| B3 | 30 | 30.08 | 110 | 110.47 |
| B4 | 50 | 50.40 | 90 | 90.42 |
| B5 | 50 | 50.40 | 110 | 110.28 |
| B6 | 70 | 70.03 | 110 | 110.42 |

Table 4: Sediment and water surface position measurements

FIG. 22

DEVICE AND METHOD FOR MEASURING THE DEPTH OF MEDIA

This application is a national stage entry under 35 U.S.C. § 371 of PCT Application No. PCT/GB2013/052182, filed Aug. 16, 2013, which claims the benefit of Great Britain Application No. 1214658.5, filed Aug. 16, 2012. The entire contents of each of PCT Application No. PCT/GB2013/052182 and Great Britain Application No. 1214658.5 are incorporated herein by reference in their entirety.

This invention relates to a device and method for measuring the depth of water and sediment deposition in pipes, channels, overland flows and tidal beaches. The invention is specifically concerned with measuring an electrical property such as the conductivity or capacitance in different mediums and therefore quantifying the depths of the different mediums. The measurement of an electrical property such as conductance or capacitance of the medium may also indicate the nature of the medium such as sediment structure, water salinity, and the presence of pollutants.

BACKGROUND

The measurement of water depth and sediment deposition is useful for understanding flow and siltation processes in pipes, channels, overland flows and tidal beaches. Sedimentation is of significant interest to geologists studying the evolution of the sea bed resulting from turbidity currents and underwater landslides. Conservationists monitoring the erosion and deposition of coastal beaches pay particular attention to the evolving behaviour of tidal levels and sediment transportation. Sediment build-up is also a major concern for water companies, particularly in sewer pipes where sediment build up can easily occur and can seriously reduce the capacity of the pipe while increasing the risk of surcharging during storm events. Therefore, it is desirable to measure both the flow depth and the amount of sediment present. Embodiments of the present invention enable the measurement of flow and sediment parameters in the context of a sewer pipe but it is to be understood that the invention is easily applicable to other areas of sediment transport and flow analysis.

Flow depth measurement can currently be accomplished by various means. Pressure sensors may be placed on the bed (for example in Bishop, Craig T. and Donelan, Mark A. 4, 1987, Coastal Engineering, Vol. 11, pp. 309-328), ultrasonic devices can be used above or within the flow to calculate the time for an acoustic signal to be reflected from the surface and hence its proximity (see, for example, U.S. Pat. No. 4,221,004) or even a simple visual scale protruding through the surface could be used. Perhaps the most all-round practical method is the use of conductance-based wave-probes. These devices consist of two parallel wires penetrating the water surface, and when a potential difference is applied across them an output voltage proportional to the conductance between the two wires and hence proportional to the submergence of the wires is measured. Similar to ultrasonic devices and pressure sensors, wave-probes may be operated remotely, and may be programmed to generate a warning if the water level surpasses a pre-determined safe range. Wave-probes offer a more economic alternative to ultrasonic devices and pressure sensors, with greater accuracy, and can also record a time series of surface level fluctuations. Similarly, capacitance-type wave probes, consisting of a single insulated wire, may be used to calculate the capacitance, which is a function of the depth and electrical properties of the water. However, wave-probes (conductance or capacitance type) must be calibrated to a specific location and configuration in order to output a meaningful depth measurement. Furthermore, any calibration may be affected by fluctuations in the local electrical conditions of the fluid such as the presence of impurities or pollutants in the fluid.

There are also a range of possible techniques for quantifying the depth of sediment at a particular point. Where possible, a simple visual scale can be used, but this is only usually an option for laboratory work where one can see the sediment level through the side of a tank or flume. Some electrical solutions have also been suggested as described below.

De Rooij et al. (de Rooij, F, Dalziel, S B and Linden, P F. 1999, Experiments in Fluids, Vol. 26, pp. 470-474) describe a system for electrically quantifying sediment layer thickness based on the measured resistance across the sediment layer. An array of electrodes is attached to the bed of a rectangular tank, and a reference electrode is positioned within the fluid. A change in sediment layer thickness produces a change in the resistance between the bed mounted electrodes and the reference electrode. Once calibrated, the measurement of the variation in the resistance enables accurate quantification of the sedimentation. There are however several limitations that present problems when attempting to implement the system in the field. The reference electrode is a cylindrical conductive rod which is required to be fully submerged. If the top of this electrode protrudes from the fluid surface then any surface fluctuations obscures the sedimentation measurement. Hence the technique is unsuitable for environments where the flow depth can vary significantly. Similarly, if the sediment layer forms to a depth in excess of the lower extremity of the reference electrode then the measurement is adversely affected. The most striking limitation of the system is that the measurement is only reliable while the system is still accurately calibrated, that is while the electrical properties of the fluid and the electrical and geometric properties of the sediment particles remain constant. As such this measurement technique is extremely effective for laboratory tests where the fluid properties are constant and sediment properties are more easily measurable, but not suitable for field measurements where the properties of the fluid and sediment are dynamic.

U.S. Pat. No. 5,032,794 (Ridd et al.) discloses a sediment measurement device consisting of a thin rod with ring electrodes positioned at intervals along its length. One electrode generates an electric field within the sediment layer and the other electrodes detect the voltage level at known positions in the electric field. Based on the voltage readings, the position of the sediment interface relative to the device may be calculated. The device is designed to be operated either in a horizontal orientation below the sediment layer, or in a vertical orientation penetrating the layer. The device is stated to be accurate to within 5% of the sediment depth, which is deemed acceptable for the context of coastal beach erosion, but is not suitable for detailed fluvial sediment analysis or pipe siltation processes, where the variation in sediment level can be very small but very significant. The device also has several other limitations. The fixed current source means that if measurements over a large range are required, the power supply must be suitably large. In the disclosure of Ridd et al. all embodiments of the device are mains powered. Although Ridd discloses that multiple boundaries may be detected by additional receiving electrodes, this is unfeasible if the physical separation of the receiving electrodes is too high (e.g. a high flow depth). The mathematical theory behind the device also assumes that there is an abrupt conductivity barrier to detect. The theory does not allow for (or quantify) gradual transitions in conductivity that are present in many sediment layers. Such a device may be practical for coastal environments where the sand sediment is reasonably uniform, but in most fluvial and sewer environments the sediment layer consists of gradual transitions in conductivity between coarse and fine sediment, and between closely packed and sparsely packed sediment. Transitions in sediment properties are of significant importance in understanding the composition and evolution of complex sediment layers and the device disclosed in Ridd et al. does not measure or identify such transitions. Similarly a more gradual sediment-flow interface caused by partially suspended sediment is difficult to detect. Furthermore, the theory is based on 3-dimensional electrical fields, and as such the device cannot function properly when other obstacles interfere with the expected field (for example the walls of a sewer pipe). Additionally, although Ridd's device gives a single sediment position reading at a point, it does not give an indication of the local gradient of the sediment layer, something very useful for understanding the erosion and deposition processes occurring. Perhaps most importantly the device is of relatively complex design and as such is financially and practically unsuitable for widespread deployment throughout a sewer system or even a coastal area. Finally, Ridd's device requires exposed conductors.

Jansen et al. (Jansen, Daniela, et al. 2005, Marine Geology, Vol. 216, pp. 17-26) disclose measuring the conductivity profile of the sea bed by lowering a conductivity sensor on a weight into the sediment. Pressure sensors calculate the depth of each conductivity reading and as such a conductivity profile plot is produced. This allows the detection of gradual changes in sediment layer composition but is unfeasible for small scale investigation such as in sewer pipes. In practice, this system is too complex to implement in small scale applications (for example in sewer systems, river reaches) and prohibitively costly for widespread use. Furthermore, the device only enables readings to be taken at discrete positions making the determination of sediment level accurate to the resolution of the measurement grid.

Similar to the depth measurement problem, quantification of sediment level is perhaps most easily achieved by conductance wave probes. Once calibrated, any change in sediment level may be indicated by the conductivity reading, since the wet sediment layer has different conductance characteristics to the water. Practically, however, this relies on the water surface remaining at a fixed level, something that is very unlikely to happen in most flow scenarios. Thus, the electrical and geometric properties of the sediment and the flow must remain constant for the calibration to remain true. This is not the case in a dynamic field environment.

Clearly there is a need for a device that can measure a conductivity profile (or profile of a different measurable electrical property), thereby locating the position of both the sediment level and the flow depth, and further measuring any changes in conductivity (or a different measurable electrical property) throughout the fluid and sediment layers. Wave probes currently provide a low cost, robust and simple measurement of water depth and surface fluctuation for a single position, but if the level of the bed changes due to sediment transport, this also affects the wave probe reading. Similarly, wave probes are also used to measure sediment position, but if the flow level changes then the calibration is invalidated. A device and method for measuring an accurate depth of fluid, depth of sediment and any changes to the position of the fluid and/or sediment would enable real time monitoring of sediment build up in sewer pipes while also providing a method and device to facilitate the monitoring of sediment erosion and deposition in a wide range of applications. Quantification of the conductivity (or a different measurable electrical property) throughout the sediment layer provides insight into the composition of the sediment, which is critical in predicting the mechanism of previous and future sediment deposition and erosion. Quantification of the fluid conductivity (or a different measurable electrical property) can give an indication of the presence of pollutants or of the degree of suspended sediment. Combining this with a measurement of local fluid and sediment surface gradients presents an unrivalled measurement device for use in many areas of science and ecology.

A single probe, comprised of two conductive wires of known dimensions may be used to measure the conductivity of a medium. Such a device, however, requires careful calibration with mediums of known conductivity. Single probe devices are also unable to ascertain the different contributions from several mediums of different conductivity and therefore are not useful for measuring fluctuations in sediment deposition and fluid level in mediums with varying conductivities. The same applies for other electrical properties such as capacitance and signal attenuation.

The conductivity of a solution is simply a measurement of the quantity of ions (charged atoms or molecules) in the fluid. The more ions present in the fluid, the more conductive the fluid becomes, since there are more charge carriers which enable a greater flow of electric charge. Electric current in an electrolyte is the flow of ions between the two electrodes.

Conductivity is the ability of a material to conduct electric current. The method used to measure conductivity is simple: two wires are placed in the sample, a potential is applied across the wires (normally a sine wave voltage), and the current is measured. Conductivity (G), the inverse of resistivity (R), is determined from the voltage and current values according to Ohm's law (and is also a function of the probe wire geometries, which are designed to remain constant).

Theory

The theory described herein relates to a conductivity based device, and is provided as one example of the theory related to the device when used to measure conductivity, but the device is not limited to a device for measuring conductivity.

Conductance wave probes function by measuring the conductance between two partially submerged conductors, such as parallel conductive wires. The voltage between the conductive wires is proportional to the submerged length of the conductive wire (or depth) in the medium or fluid and depends upon the electrical properties of the medium or fluid. The ratio of the output voltage to the submergence depth (V/d) is governed by the electrical properties of the medium being tested, and the material and geometrical arrangement of the probe conductors. FIG. 1 (prior art) illustrates a probe constructed from uniform conductive material, consisting of two parallel conductive wires with a fixed separation between them, wherein the probe penetrates the full depth of flow and sediment (FIG. 1).

The output of the wave probe is a summation of the conductive effect of the fluid and the sediment layer. Since the electrical properties of the sediment are different to that of the water each has its own value of (V/d), and as such the overall output of the probe is given by $$V_{total} = (V/d)_{fluid} \times D + (V/d)_{sediment} \times h, \qquad \text{(equation 1)}$$

where D is the depth of fluid and h is the depth of sediment. Any change in D or h will affect the voltage output.

It should be understood, that any electrical property which is affected by its surroundings may be used in the same manner as described above to identify the depth of fluid and/or sediment. Therefore, in equation 1, the voltage may represent any electrical property measurable by exposed or insulated conductors, which is affected by the surrounding medium.

BRIEF SUMMARY OF THE DISCLOSURE

In accordance with a first aspect, there is provided a device for the depth of at least one conductive medium, the device comprising an array of elongate, substantially mutually parallel electrodes each having a predetermined length, the lengths being incremented stepwise from a shortest electrode to a longest electrode, the device further comprising electronic circuitry to apply a potential difference across selected pairs of electrodes and to measure a resulting conductance between each selected pair of electrodes, the measured conductance providing an indication of a submersion depth of the pair of electrodes in the at least one conductive medium.

In accordance with a second aspect, there is provided a device for the depth of at least one conductive medium, the device comprising an array of elongate, substantially mutually parallel electrodes each coated with an insulating material and each having a predetermined length, the lengths being incremented stepwise from a shortest electrode to a longest electrode, the device further comprising electronic circuitry to apply a potential to each electrode and to measure a resulting capacitance of the at least one conductive medium, the measured capacitance providing an indication of a submersion depth of the insulated electrode in the at least one conductive medium.

The benefit of the present invention is that the device is able to identify a relative measurement of the depth of fluid or sediment the device is submersed in, relative to the position of the device. The device is adapted to reduce the need for complex calibration or for external power sources and the device can be realised using electrodes that are exposed or insulated from the surrounding medium depending on the electrical property used as the basis of the measurement. For example when using conductance, the electrodes are exposed to the surrounding medium, whereas, when using a measure of capacitance or signal attenuation, the electrodes are insulated from the surrounding medium.

Preferably, the electrodes are configured to measure conductivity or capacitance or a different electrical property across the entire length of the electrode pair.

Preferably, the electrode pairs are spaced equidistant from each other. Only electrode pairs with equal spacing are used for a given measurement set, as this allows the device to identify the boundaries between different media without the device being unduly affected by a change in the electrical properties of the surrounding media, and indeed, enables the measurement of a change in the electrical properties of the surrounding media.

Preferably, adjacent electrodes are spaced a distance from each other, equal to or less than a grain or a pore size of the one conductive medium. As such, electrodes are in close proximity, and so each electrode pair must also be in close proximity.

The benefit of the proximity of the electrode pairs to one another is that the device does not need to be calibrated because the measurement of electrical properties is a relative measurement based on the length of the electrode and a measurement that is proportional the an electrical property. The respective depths of at least one conductive medium are then identified relative to the length of the electrode. Consequently, the device may be deployed in environments of unknown electrical properties, without the need to a calibration, or for the electrical properties to remain constant. The close separation has the additional advantage of reducing the power required to operate the device.

The at least one conductive medium may comprise multiple layers of conductive media, such as layers of fluid, wet sand, or soil slurries.

If operating on the principal of capacitance rather than conductance, each electrode is insulated from the flow and sediment, the insulation acting as the dielectric of a capacitor whereby the conductor forms one plate of the 'capacitor' and the water, i.e. surrounding media, forms the second plate. Alternatively two electrodes can act as capacitor plates, with the insulation and surrounding media acting as the dielectric material. Measured capacitance is therefore a function of flow and sediment depth in the same way as the measured conductance between two un-insulated conductors. Other properties may be used when the device is operated in its insulated mode, such as signal attenuation, whereby each pair of electrodes acts as a source and receiver for a signal, such as a radio signal, and the radio signals experience a different level of attenuation based on the medium through which the radio signal propagates, allowing exactly the same function as the capacitance or indeed conductance based operation modes.

In a preferred embodiment, the lengths of the electrodes of the array may be increased in monotonically regular increments and may also be increased and then decreased within the array.

In another preferred embodiment, the electrodes are formed as conductive strips on a dielectric substrate.

In another preferred embodiment, the substrate on which the electrodes are formed may be curved or otherwise shaped so as to conform to an inner surface of a pipe or channel.

In another preferred embodiment, a potential difference is applied across adjacent electrodes.

In another embodiment, a potential difference is applied across non-adjacent electrodes.

In another preferred embodiment, a potential difference is applied across electrodes that have substantially similar lengths.

In another embodiment, a potential difference is applied across electrodes that have different lengths.

In another preferred embodiment, the electronic circuitry includes a multiplexer that is used to select two of the electrodes in the array and apply a potential difference across the two selected electrodes and further include moving along the array of electrodes in sequence. The pairwise nature of applying a potential difference across two electrodes avoids unwanted affects associated with interference and possible electroplating around the conductive wires.

Typically, positioning electrodes or sensors in such close proximity results in electrical interference. However, by using a multiplexer only one electrode pair is used at any one time, and therefore electrical interference between neighbouring electrode pairs is reduced.

Selecting the electrodes may be carried out sequentially in various different orders such as selecting neighbouring pairs and applying a potential difference across then, or by selecting pairs of alternate electrodes or by selecting every $n^{th}$ electrode where n=1, 2, 3. Where the array comprises both electrodes of monotonically increasing lengths and electrodes of decreasing lengths, the two outermost electrodes may be selected followed by consecutive electrode pairs working inwards along the array. This sequence may be useful for averaging local variations in the depths of sediment and flow along the array.

In another preferred embodiment, the capacitance between each electrode and the surrounding medium may be measured.

In a preferred embodiment, the electronic circuitry applies a square wave alternating potential difference across any two conductive wires selected from the array; the frequency of the square wave depends on the application but typically ranges from about 1 Hz to about 10000 Hz. A square wave potential difference output is used to avoid unwanted artefacts such as polarisation effects and interference.

In another embodiment, the conductivity profiler is adapted to communicate the value of the measured conductivity profile to a control centre, the control centre having a calculator configured to calculate the relative depths of mediums of different conductivities.

Embodiments of the invention therefore seek to provide a device having an array of electrodes for measuring and monitoring the relative depths of multiple layers of media with differing electrical properties.

In accordance with a third aspect, there is provided a device for determining depth of at least one conductive medium, the device comprising a probe including at least one electrode, and a motor, wherein the motor is adapted to drive the probe at a predetermined rate into and/or out of a medium, the device further comprising electronic circuitry to apply a potential to the probe and dynamically to measure the conductivity of the medium as the probe is being driven into and/or out of the medium, thereby providing an indication of submersion depth of the probe in the at least one conductive medium.

In accordance with a fourth aspect, there is provided a method of measuring a conductivity profile, including positioning an array of electrodes within at least one medium, selecting a pair of electrodes, applying a potential difference across the pair of electrodes and measuring the conductivity across the pair of electrodes, and plotting the electrode length against the measured conductivities.

The measured conductivities may be a measured value proportional to conductivity. Plotting the electrode length against the measured value enables the detection of a boundary between media of different conductivity, and furthermore, enables the detection of a change in the conductivity. However, if an absolute value of conductivity is required, a one-time calibration may be performed, to identify the constant of proportionality required to convert the measured value into an absolute value of conductivity. If the constant of proportionality multiplied by the measured value is plotted against probe length, the gradient is equal to the conductivity. It follows that mathematically differentiating constant of proportionality multiplied by the measured value is plotted against probe length results in a profile of the conductivity throughout the sample.

In accordance with a fifth aspect, there is provided a method of measuring a capacitance profile, including positioning an array of electrodes within at least one medium, selecting an electrode, applying a potential to the electrode and measuring the capacitance of the at least one medium, and plotting the electrode length against the measured capacitances.

The measured capacitances may be a measured value proportional to capacitances. Plotting the electrode length against the measured value enables the detection of a boundary between media of different capacitances, and furthermore, enables the detection of a change in the conductivity. However, if an absolute value of capacitances is required, a one-time calibration may be performed, to identify the constant of proportionality required to convert the measured value into an absolute value of capacitances. If the constant of proportionality multiplied by the measured value is plotted against probe length, the gradient is equal to the capacitances. It follows that mathematically differentiating constant of proportionality multiplied by the measured value is plotted against probe length results in a profile of the capacitances throughout the sample.

The present inventors have surprisingly found that it is possible to identify the relative contributions of layers of different mediums for example, sediment and fluid by using an array of electrodes, each electrode having an incremented length. Such a device can determine the depths of different fluid/sediment layers by determining a conductivity profile measured against total fluid depth. The device avoids the need to calibrate against known materials of known conductivities and is thus useful for use in remote locations such as pipes and channels and especially in sewage pipes. The device is both inexpensive and reliable. The device may also be used in numerous other applications to monitor erosion for example, near or around structural supports of bridges embedded in river beds.

Advantageously, the device may be used in a variety of different applications including monitoring sediment deposition on sewage pipes and channels, and for monitoring erosion in the vicinity of underwater structural members on river beds, displaced sand on tidal beaches and used to measure the location of underground water tables when embedded into building foundations. The device may also be used as a soil probe to identify the existence of different materials. The device is simple and inexpensive to produce, does not need to be calibrated and can be operated using a battery allowing it to be installed in the field without the requirement of costly maintenance. Furthermore, the device may be left in position at a testing site for long term monitoring or, conversely, may be used as an inspection device i.e. pushed into the flow and sediment for an instant measure of the depth of sediment and water.

The device is remarkably inexpensive and simple to manufacture. It can be conveniently used as either a permanently fixed monitoring device, or an on-demand inspection device. This facility provides water companies, conservationists and researchers with a new tool for the accurate quantification of flow and sediment properties for a range of marine, fluvial, and laboratory environments.

BRIEF DESCRIPTION OF THE DRAWINGS

Embodiments of the invention are further described hereinafter with reference to the accompanying drawings, in which:

FIG. 20 includes tables of testing conditions Test Set A and Test Set B.

FIG. 21 includes tables of Effective Response Depth and Water Surface Position Measurements for the probes from Test Set A of FIG. 20.

FIG. 22 is a table of Sediment and Water Surface Position Measurements for the probes from Test Set B of FIG. 20.

DETAILED DESCRIPTION

Figure 1:
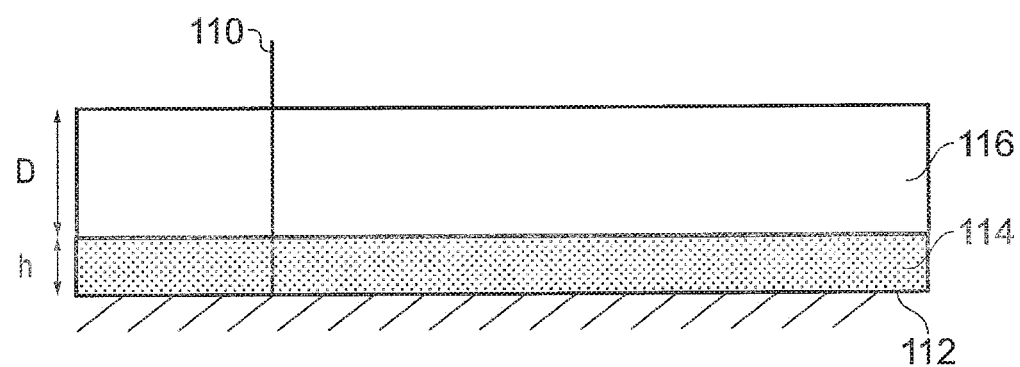
FIG. 1 illustrates a wave probe (prior art).
Figure 2A:
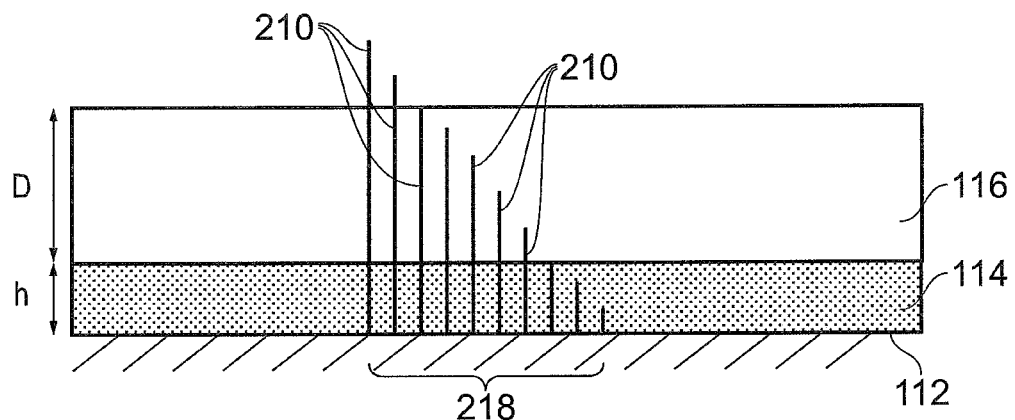
FIGS. 2a, 2b, and 2c illustrate wave probe arrays according to embodiments of the present invention, wherein each line corresponds to a single electrode.

FIG. 2a illustrates a conductivity profiler 218 comprising an array of a plurality of pairs of conductive wires 210 or alternatively, electrodes 210, juxtaposed on a non-conductive substrate. The length of each electrode or pair of electrodes 210 is incremented, though the device is still perfectly operational if the length of each individual wire 211 (not shown on FIG. 2a, but shown on FIG. 6) is incremented. The increments are depicted monotonically, but again this is not always necessary. The increments of the lengths of the electrodes 211 will correspond to the degree of accuracy the device can deliver in measuring the depth of conductive media such as sediment 114 depth and fluid 116 depth. Therefore, the greater the number of electrodes, and the greater the overall range of electrode lengths, the broader the measuring capabilities of the device. Such parameters will be specific to the application of the device. For example, when using the device 218 to measure layers of conductive media such as the sediment 114 and fluid 116 level in a sewage pipe, the device must be able to fit inside the pipe and thus the dimensions of the pipe dictate the dimensions of the device.

The degree of accuracy is not constrained by the increments in electrode length. The levels of sediment and fluid (or other medium) can be determined to accuracy much greater than the size of the increments between the electrodes, due to the analysis method described. The degree of accuracy however is improved as the size of the increments between the electrodes is reduced.

The electrodes 211 are also provided with means for applying a voltage across any two electrodes selected from the array, and measuring the resultant conductivity between the any two electrodes. Typically, a multiplexer is used to select and switch between different electrodes and therefore enable the measurement of a conductivity profile across the entire device. The device may also be operated manually, so that individual electrode pairs may be selected manually in order to test, maintain, or debugging the system.

Figure 6:
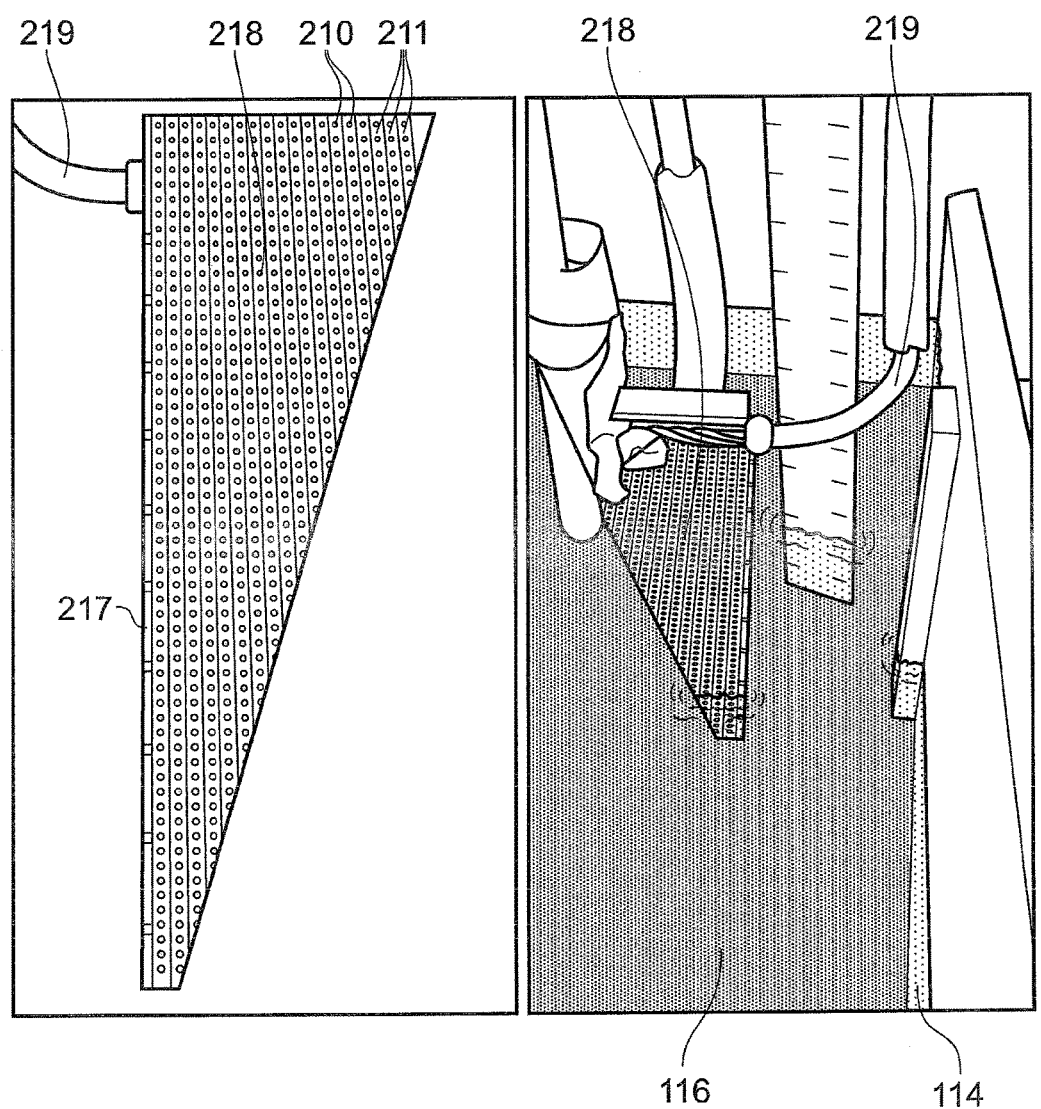
FIG. 6 shows a particular embodiment of the present invention.

A conductivity profiler 218 including a plurality of electrodes 211 is shown in FIG. 6. The substrate is made from electrical strip-board 217 with tinned-copper conductive wires (i.e. the electrodes) 211 and measures 5 cm in width. It should be noted that the substrate 217 could be made from a variety of different materials and could be rigid or flexible. Furthermore, the substrate could be curved so as to fit inside a pipe or a channel. The substrate as shown in FIG. 6 includes 20 electrodes 211, and the corner of the substrate is cut at an angle of 76° resulting in an array of electrodes of incremented length.

The electrodes 211 are connected to a means for selecting individual electrodes pairs and applying a voltage across them. Electrodes pairs 210 may be manually selected, or a multiplexer may be incorporated to switch quickly between electrode pairs. This enables real time monitoring of the conductive media such as sediment 114 depth, the fluid 116 depth and the conductivity profile.

Figure 2B:
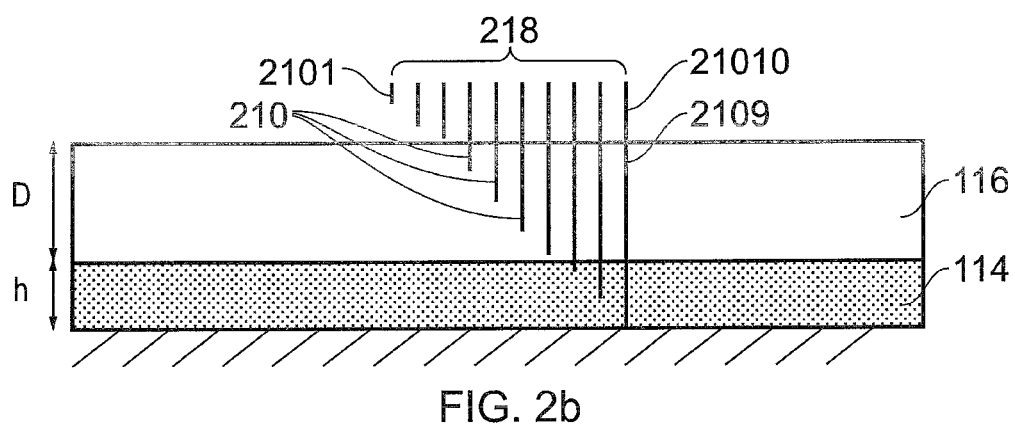

FIG. 2b shows a particular embodiment of conductive electrodes organised into adjacent pairs of uniform separation, yielding ten wave probes 210 corresponding to the 10 electrode pairs, numbered from 1 to 10, 1 being the shortest probe 2101 and 10 being the longest probe 21010.

In order to increase the accuracy and resolution of the conductivity profiler, each conductive wire (except the two most extreme) could form part of two distinct conductive wire pairs, yielding 19 effective wave probes. Electrodes may also be paired with non-adjacent wires, yielding from binomial coefficient theory a total number of effective wave probes of $$\binom{20}{2} = \frac{20!}{2!(20-2)!} = 190$$

for a set of 20 conductive wires 211. Wave probe readings may be obtained using a single wave monitor module, for example as supplied by Churchill Controls. As described above, the device works on the principle of measuring the current flowing in a probe 210 which consists of a pair of parallel electrodes. The probes are energized in a pairwise manner to avoid interference due to their close proximity to each other. Each probe is energised (i.e. a potential difference is applied across the selected electrodes) in turn, with a high frequency square wave voltage to avoid polarisation effects at the electrodes/conductive medium surface. The frequency ranges from about 0.01 to about 10000 Hz, but the preferred frequency is 100 Hz. The current is sensed by an electronic circuit providing an output voltage proportional to the instantaneous depth of immersion of the probe in the sediment and fluid. The voltage is proportional to the submerged depth for electrodes of uniform properties and separation, submerged in a uniform fluid. A multiplexer switches between different electrode pairs at a preferred rate of 100 Hz, but this could range from about 0.01 Hz to about 1000 Hz if the energisation frequency is suitably high.

FIG. 6 illustrates a test rig 218 used to test the device under steady conditions. For each of the conditions described below in Table 1 of FIG. 20, the sediment 114 and fluid 116 levels were set using a standard scale accurate to 1 mm, and the device was then pushed into position in the sediment layer. The sediment used was coarse sand 114 and the fluid used was water 116. The probes were selected and energized individually and the voltage output from the wave monitor was recorded. Electronic circuitry 219 is not shown in the figure but may include means for manually energizing the probes or alternatively, a multiplexer as mentioned above.

FIG. 2a illustrates a typical array of a plurality of wave probes 218, each probe 210 comprising two electrodes 211 (not shown), extending upwardly from the bed 112 (e.g. bottom of pipe or channel, river bed or sea bed), each wave probe 210 having an incremented length, such that the longest probe protrudes from the water surface, and the shortest probe ends within the sediment layer.

The voltage for each probe 210 in the array 218 is governed by equation 1. However, for an array of 10 probes, where the first probe is denoted by i=1, through to the last probe denoted by i=10, each of length $L_i$ (probe 1 has the largest $L_i$, probe 10 has the smallest), the voltages at probes 1 to 3 are given by:

$$V_i (V/d)_{water} \times D + (V/d)_{sediment} \times h,$$

the voltages at probes 4 to 7 are given by:

$$V_i (V/d)_{water} \times (L_i - h) + (V/d)_{sediment} \times h,$$

and the voltages at probes 8 to 10 are given by:

$$V_i = (V/d)_{sediment} \times L_i.$$

It should be noted that the ratio V/d is proportional to the conductivity in the medium.

V/d is not equal to the conductivity, but rather V/d is proportional to the measured conductivity. The measured value V/d may be converted into a conductivity by calibrating the device with a material of known conductivity to enable the calculation of a constant of proportionality which may then be used to modulate the measured value into a value of conductivity. The calibration would only require carrying out once, during manufacture, for example, and would not be affected by changes in the local properties at the location where the device is installed. Where manufacturing quality is high, calibration may be performed for one device and the same calibration information applied to all others, or the devices may be designed with a predetermined constant of proportionality. $V_i$ is therefore effectively proportional to conductance, or alternatively, proportional to the property being measured, such as capacitance or signal attenuation, in the instance that insulated electrodes are deployed.

Figure 3:
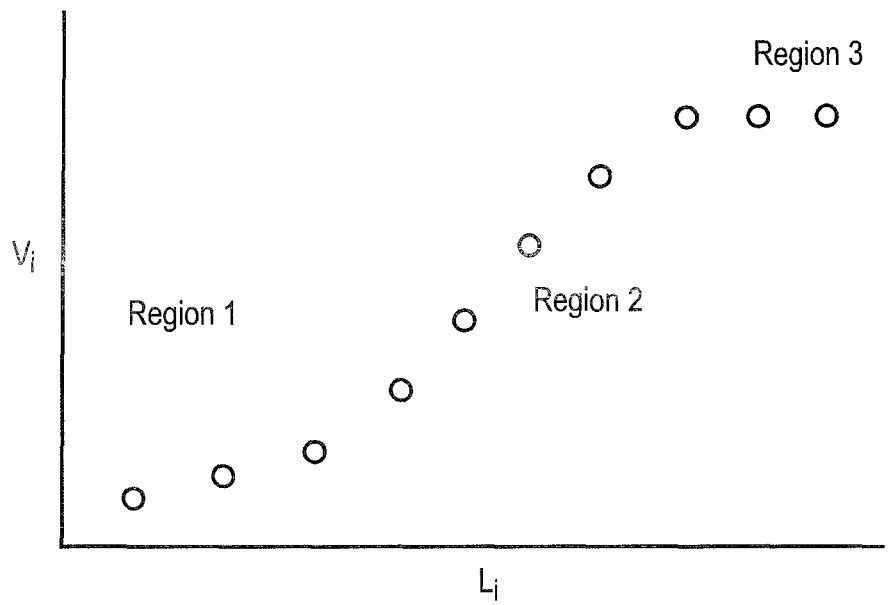
FIG. 3 illustrates the theoretical plot obtained from a typical probe array, wherein the y-axis is the measured value, proportional to conductivity or capacitance for example.

Assuming the sediment consists of wet sand, the conductance in the sediment layer is typically lower than in the fluid layer, and hence a change in submerged length within this layer, causes a smaller change in the output voltage. FIG. 3 illustrates the theoretical plot of probe length ($L_i$) against the probe output ($V_i$) showing three different regions. Again, other properties such as capacitance or signal attenuation are also affected by changes in the media e.g. from a fluid layer to wet sand.

In FIG. 3, region 1 corresponds to the probes which end within the sediment layer. Differences in output are solely due to the differences in length of the probes and are governed by $(V/d)_{sediment}$. Region 2 corresponds to the probes which end within the water layer having fully penetrated the sediment layer, and the differences in output are due to the differences in length of the probes and are governed by $(V/d)_{water}$. Region 3 corresponds to the probes which penetrate the flow surface, and hence give the same output, since they each have equal submergence in both the sediment layer and water layer.

Figure 4:
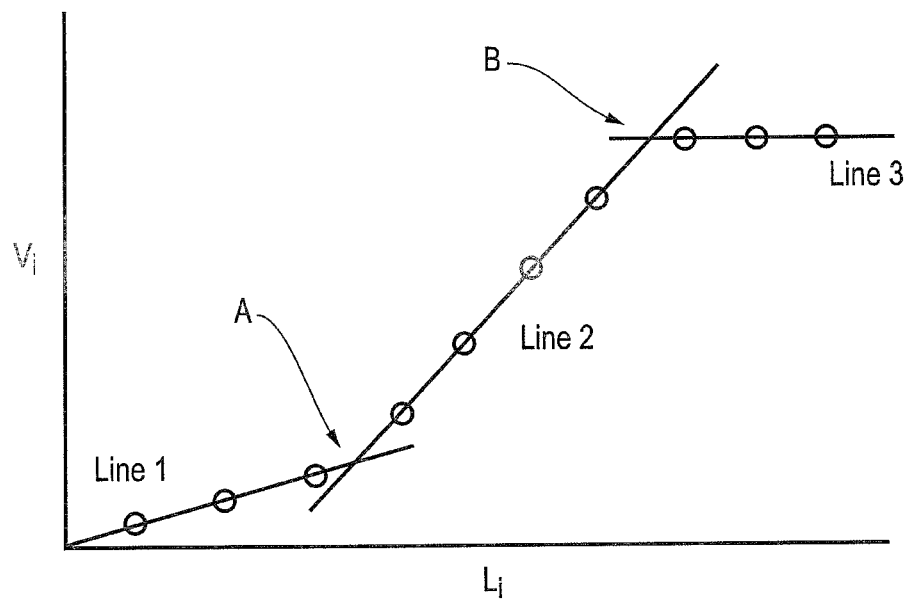
FIG. 4 shows linear regression lines on a theoretical plot obtained from a typical probe array.

FIG. 4 shows that a linear regression line may be fitted to each region of the graph in FIG. 3. The intersection between linear regression lines 1 and 2 (labelled A) corresponds to the transition from sediment layer to water layer, and consequently the sediment depth to be obtained from the x-axis. The intersection between lines 2 and 3 (labelled B) corresponds to the position of the air-water interface, and therefore the position of the water level to be obtained from the x-axis. A change in water depth does not affect the position of point A. Similarly a change in the position of the sediment layer, whilst causing a change in the y-axis position of point B, does not affect the position on the x-axis. Therefore, the depth of sediment and water level are mutually exclusive and can be measured independently of each other.

The intersection between linear regression lines 1 and 2 indicates the location of a boundary in the measured property in the media. Multiple points of intersection may be identified in media having many layers of different electrical properties.

The identification of multiple boundaries within the at least one media is only possible due to the use of pairs of adjacent electrodes whereby each electrode pair is separated by the same distance, as opposed to a common reference electrode typically used in the prior art. The use of elongated probes of different length rather than point probes at different positions throughout the media means measurements of the electrical property are taken across different ranges of the surrounding media rather than at different positions throughout the media. This increases accuracy significantly since the position of boundaries between different media can be detected with improved resolution compared with systems using increments between probe lengths. Furthermore, the number of electrodes required for making accurate measurements is reduced, thereby reducing materials and costs.

The gradient of line 2 indicates the conductance of the water or fluid medium. If the fluid medium were replaced with another fluid medium of different electrical properties, the voltage on the probes that reach the flow layer are vary and the gradient of line 2 changes accordingly. The x-axis position of points A and B remain unaffected, so measurement of depth and sediment level is obtainable. The gradient of line 2 is used to quantify the electrical conductance of the fluid medium, which provides a further useful method for characterizing the conductivity of unknown flow substances, or detecting the presence of pollutants within a fluid medium.

The gradient of line 1 indicates the conductance of the sediment layer, and could be used to categorize the sediment composition (e.g. fine sand, coarse sand, clay, etc). Line 1 may also be non-linear or jointed, which indicates a non-uniform sediment composition (e.g. fine sand upon coarse sand). In the case of overland flows, if the rainfall intensity is higher than the infiltration rate (Hortonian overland flow), then the shape of line 1 describes the saturation of the sediment (ground surface) as the moisture penetrates downwards, and another region before region 1 is likely to exist where the substrate medium is dry.

The existence of a floating medium (for example due to an oil spill), whereby the floating medium has a different electrical conductance compared with water, and creates a further linear region between region 2 and region 3.

One key advantage stems from the relative quantities measured so that the probes do not require calibration.

Again, the above method is not limited to measurements of conductivity and the measured values could be capacitance, or signal attenuation or other properties of the sediment or surrounding media that can be measured using pairs of insulated or exposed electrodes.

One disadvantage is that for certain embodiments it is assumed that the flow depth and sediment level are uniform along the length of the probe array (i.e. from probe 1 to probe n, where n is the number of probes). As such the physical horizontal length of the array should be as small as possible. The vertical length can be as large as required for the particular application. This disadvantage may be overcome in other embodiments by using additional arrays in combination with a multiplexer to select electrode pairs and apply a potential difference across the pairs is a particular sequence. By using more than one array, the gradient of the boundary may be determined.

Figure 5:
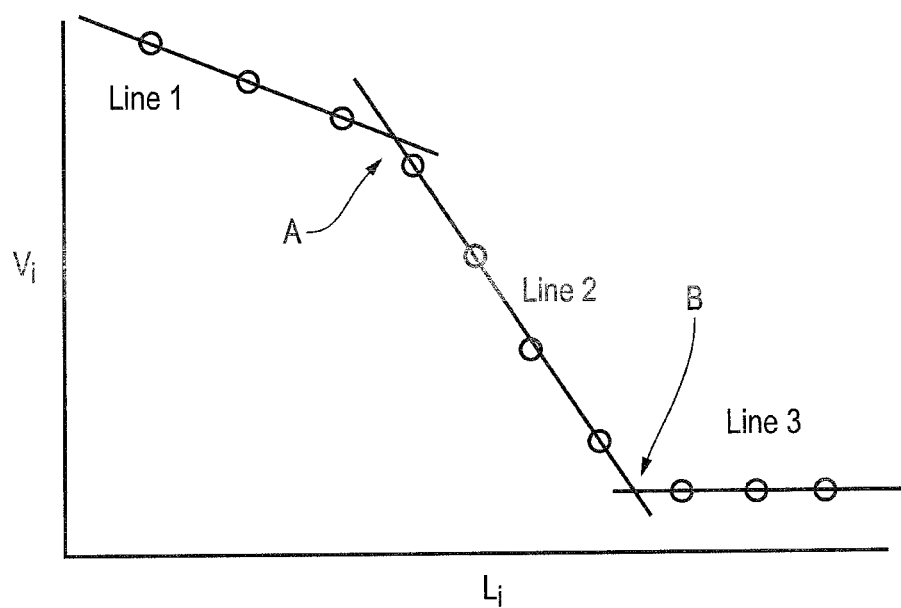
FIG. 5 shows linear regression lines on a theoretic plot obtained from a typical inverted probe array.

FIG. 2b illustrates an alternative embodiment with the probe array 218 extending downwards into the fluid 116 and sediment 114 layers. FIG. 5 illustrates the theoretical output for an inverted array. Here $L_i$ is defined as the distance from the bed to the lower tip of each probe. This is the submergence at which the probe starts to give an output, or its 'effective response depth'. As before, point A corresponds to the sediment position, point B corresponds to the water surface position, and the gradients of lines 1 and 2 correspond to the conductivity of the sediment and fluid respectively.

Testing

Figure 7:
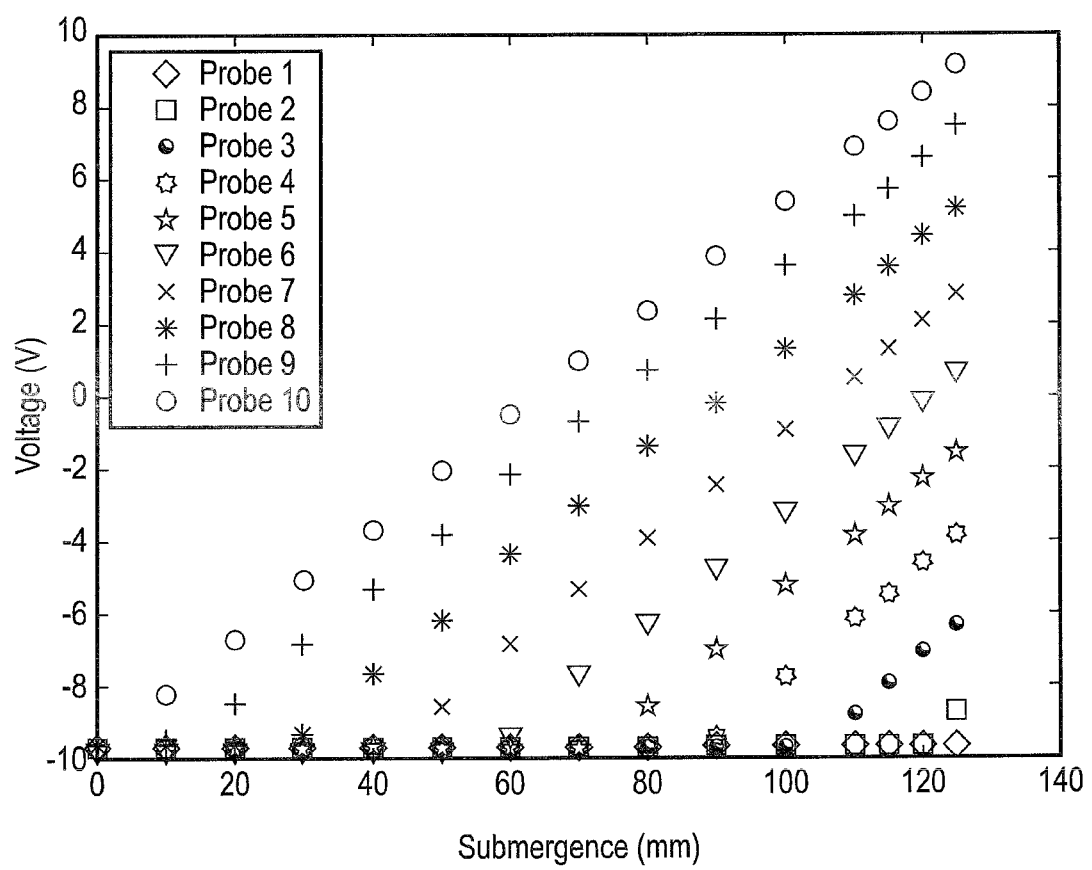
FIG. 7 shows the response of the conductivity profiler for each probe.

Table 1 of FIG. 20 shows the different testing conditions. Test set A was conducted in order to calculate the effective length of each electrode pair (probe), and the submergence at which the probe begins to respond. The minimum submergence could not be explicitly stated due to the geometry of the conductive wire ends caused by cutting the strip-board at an angle. FIG. 7 shows the voltage output of each electrode pair as a function of submergence.

The first aspect to note is the remarkably linear response of all ten probes once submerged. This linear response is accurate to a determination coefficient of 0.998. This is due to the very precise manufacture of electrodes made from electronic strip-board. The lower value on the graph of −9.688V is the datum of the wave monitor corresponding to zero submergence. By fitting a first order regression line to the linear region of each probe response, the point at which −9.688V is crossed gives the submergence at which each respective probe begins to act, and hence it's effective response depth. When calculating these values, the data of tests A3, A5, A7 and A9 were omitted in order to use this subset later to verify the technique. The resulting effective response depths of the ten probes are shown in Table 2 of FIG. 21.

Figure 8:
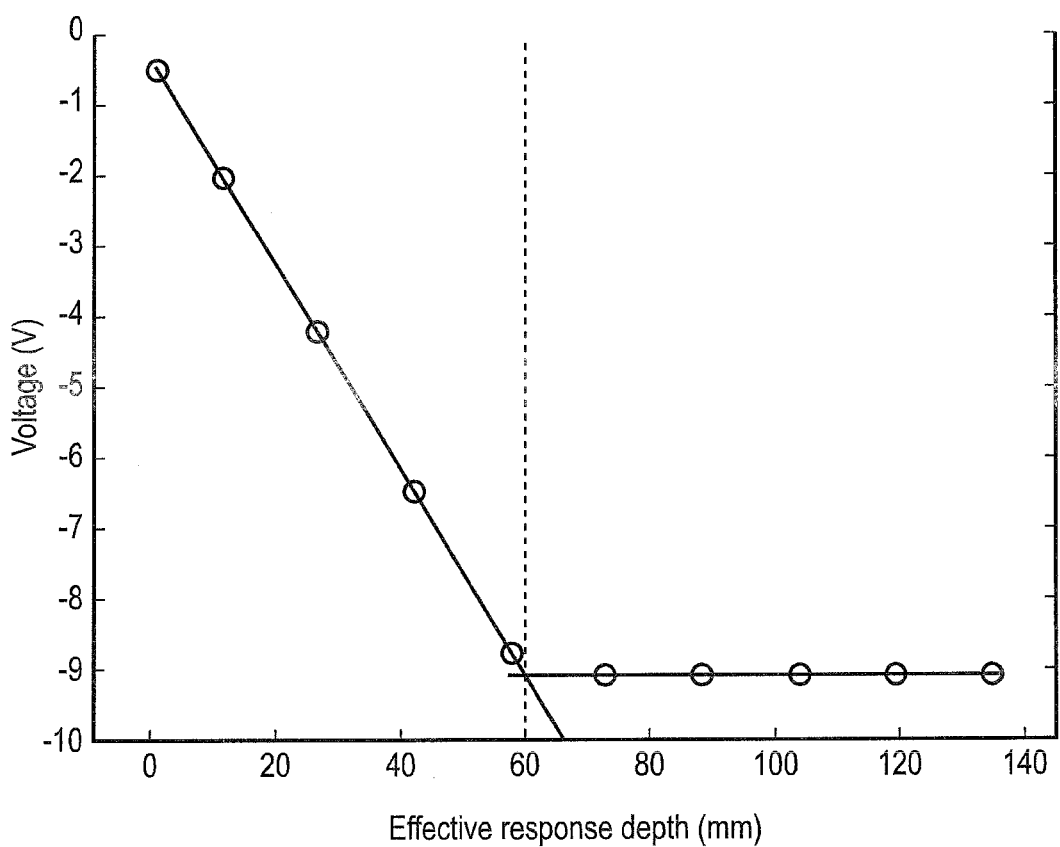
FIG. 8 shows the fluid surface estimation.

The water surface location technique was tested initially using data from test set A of FIG. 20. For the test conditions A3, A5, A7 and A9, readings from all probes were plotted against their effective response depths. An example of this plot is shown in FIG. 8 for a water depth of 60 mm (test A7). It can be seen that the intersection between the two linear regions of the graph occurs at approximately 60 mm on the x-axis as expected.

The exact location of the intersection between the two regression lines are given in Table 3 of FIG. 21 for the four test conditions. It can be seen that the location of the water surface is measured to within 0.5 mm of the actual water surface position. This is well within the accuracy of the reference measurement method (standard scale accurate to 1 mm) with a maximum error of around 2%.

Figure 9:
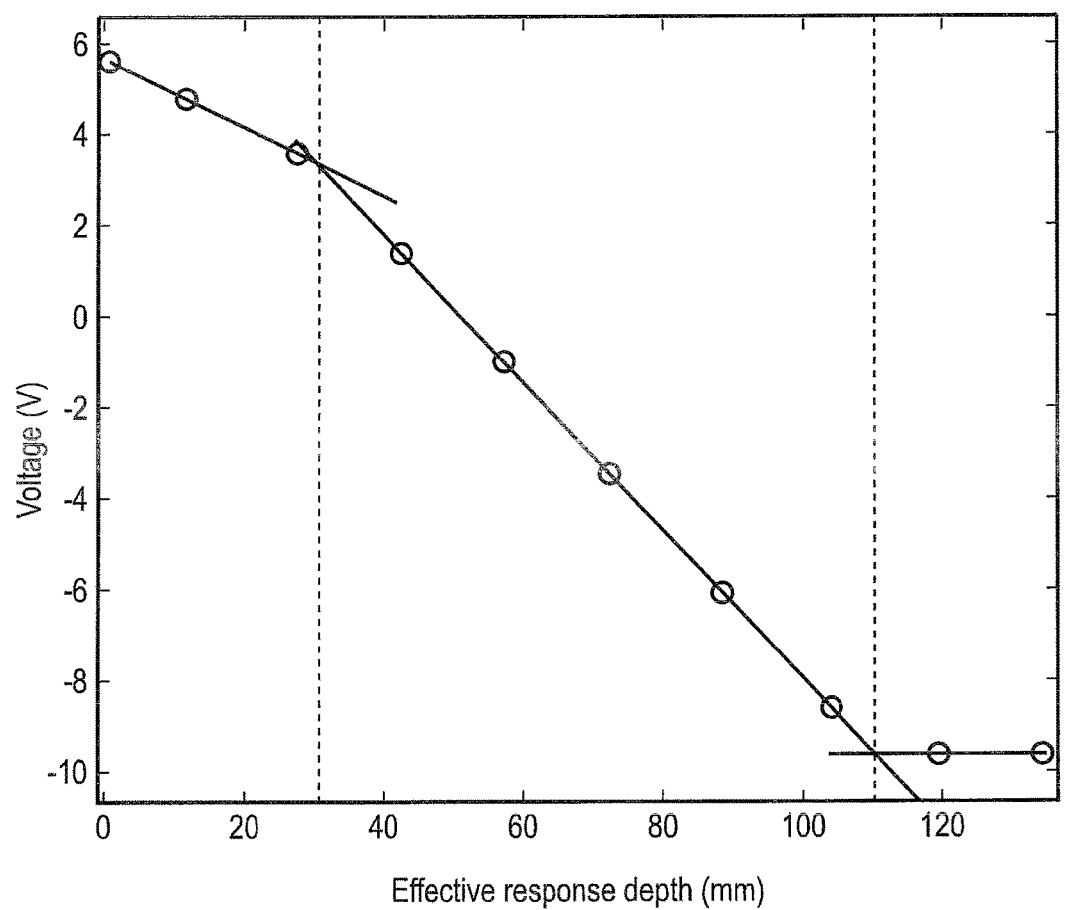
FIG. 9 shows the fluid surface position and the sediment depth estimation.

The next phase is to assess the device's performance in measuring simultaneously the position of both water level and sediment depth. The data from test set B of FIG. 20 is used. FIG. 9 illustrates the analysis procedure using data collected from test B8.

It can be seen that the first intersection corresponding to the sediment position occurs at approximately 30 mm and the second intersection corresponding to the water surface location occurs at around 110 mm. These values are as expected. The measurements of sediment and water surface position for each of the cases in test set B are given in Table 4 of FIG. 22.

Figure 10:
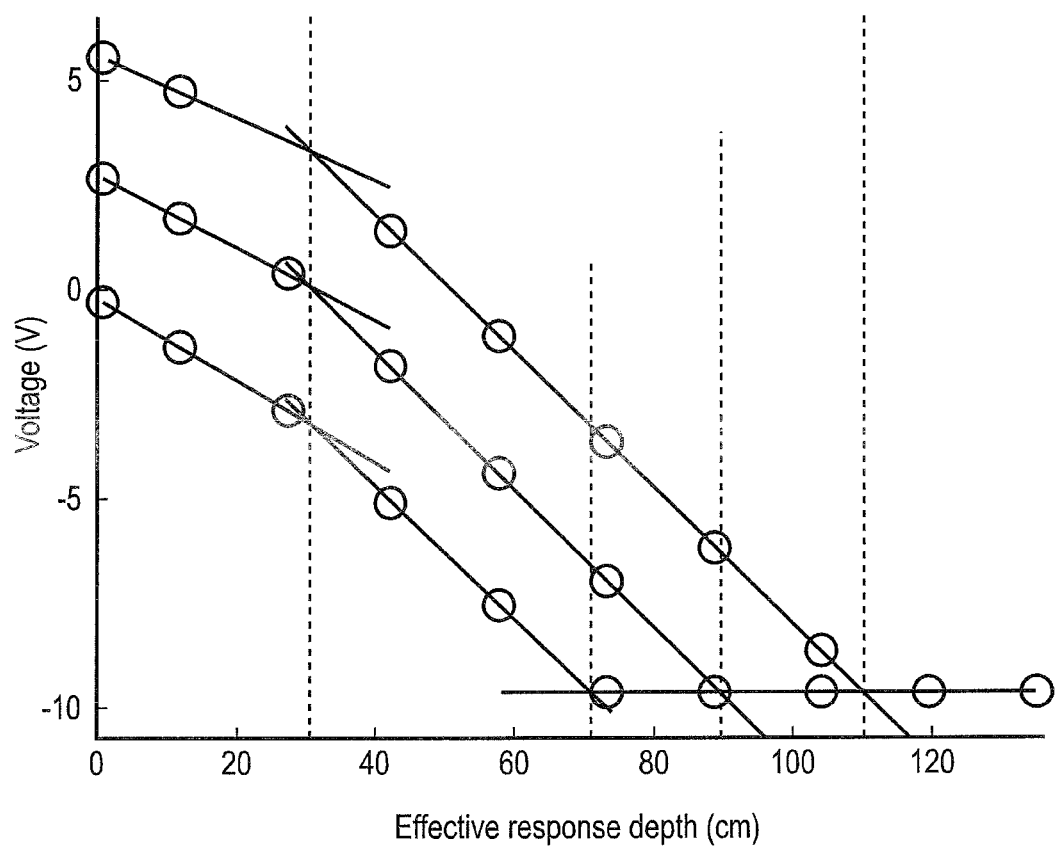
FIG. 10 corresponds to a varying fluid level but constant sediment depth.
Figure 11:
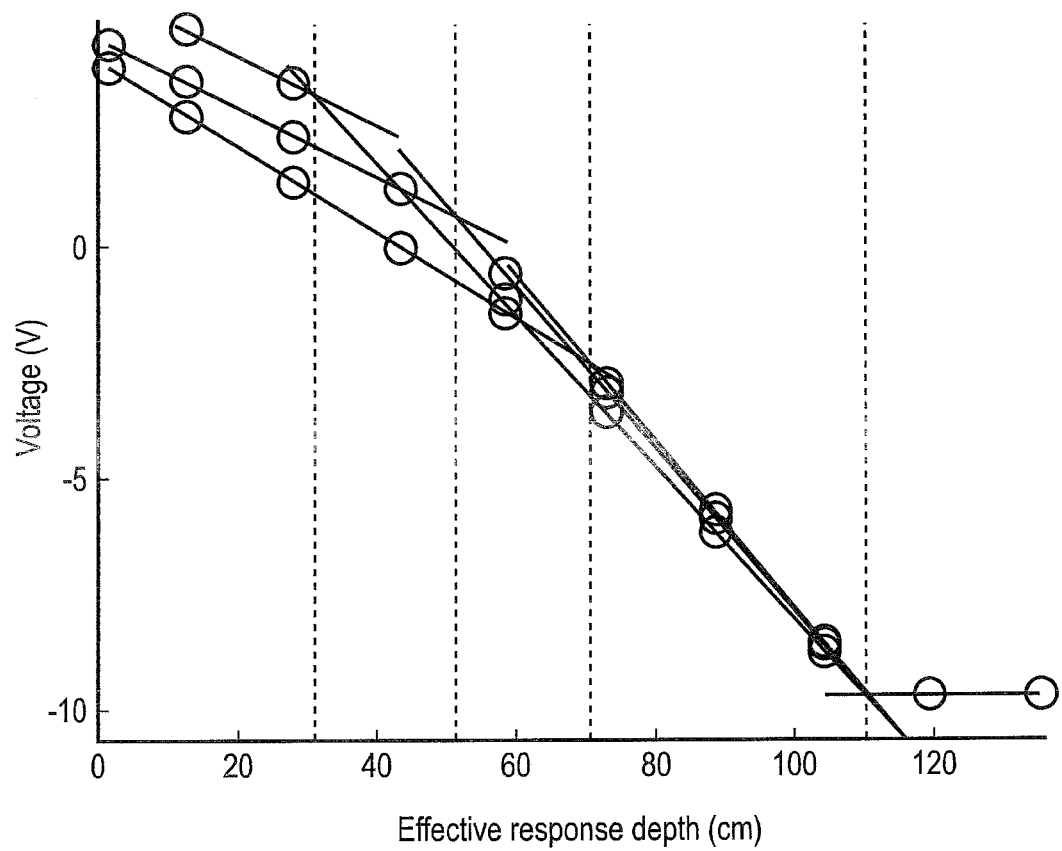
FIG. 11 corresponds to a constant fluid level but varying sediment depth.

The error is also within the error range of the reference measurement; that is within 2% of the expected value (it is expected that the true error of the device is even lower). FIGS. 10 and 11 illustrate the affect that varying the sediment level and the water level has on the shape of the plot. FIG. 10 shows B1, B2, B3 readings with constant sediment depth but different water levels, and FIG. 11 shows B3, B5, B6 readings with constant water level but different sediment depths.

As described previously, the gradient of the regression lines in the sediment phase and fluid phase provide a measurement of the conductivity. The conductivity of the phase can be used to identify the composition of the sediment and fluid respectively. It is of note from these graphs that the sediment and fluid conductivities appear to vary slightly between test conditions. This is thought to be due to slight human error in the orientation of the probe device. Although it was positioned approximately vertical for each condition, any slight variation form this causes a change in the measured conductivity. It does not significantly affect the effective response depth of each probe and therefore the intercept points and depth measurements are not affected.

In further embodiments, the device is used to quantify the location of more than two abrupt conductivity boundaries. The device may potentially measure multiple boundaries, and more importantly measure gradual changes in conductivity throughout a sediment medium.

Figure 2C:
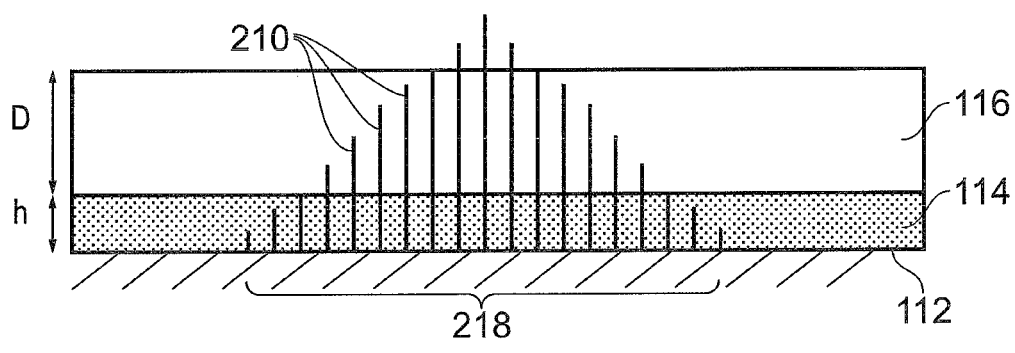
Figure 12:
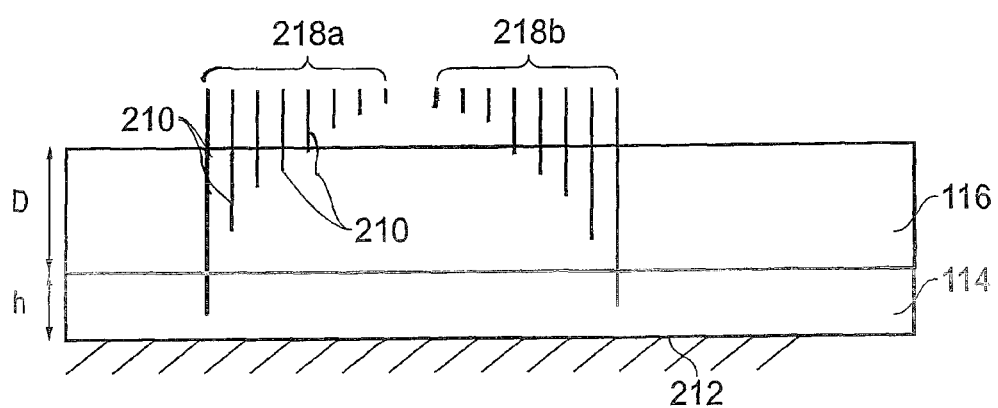
FIG. 12 shows a further embodiment.

FIG. 12 shows a further embodiment comprised of two arrays 218a, 218b arranged collinearly with the end of one array 218a next to the beginning of the other array 218b. FIG. 2c also shows this arrangement, designed to accommodate a gradient in the level of sediment and/or fluid. Although shown with different electrode lengths, arrays 218a and 218b are substantially a mirror image of each other. Furthermore, the electrode lengths within a particular array are all unique in order to ensure the same relative properties for each pair of adjacent probes. For example, consider four electrodes, electrode 1, electrode 2 and so on. If all four electrodes have a unique uniformly-incremented length, then electrode pairs 1 and 2, 2 and 3, and 3 and 4 have the same properties but different effective lengths, so three independent measurements can be obtained from the four electrodes. If you extend this to an electrode array having 32 electrodes, then 31 measurements can be taken instead of 16 (16 would be obtained by simply taking only electrode pairs). Therefore, it is beneficial for each electrode to have an incremented length, and not each electrode pair.

For symmetrical arrays, the voltage readings from probes 210 of equal length may be averaged and the resulting sediment and flow depth measurements correspond to the true values at the centre of the array, providing any non-uniformity is approximately linear. For example, the two outer electrode pairs would be the same length, and so the average reading from these two would give the expected reading at the centre of the array. This configuration also allows for the deduction of the local gradient of the sediment, which gives an indication of erosion effects and sediment transport direction. A further array or pair of symmetrical arrays, orthogonal to this (not shown) enables three-dimensional assessment of local sediment gradient, but may also influence the sediment transport since part of the array may be positioned normal to the transport direction. It has been shown herein that sediment level and water surface position may be simultaneously measured to within 2% of the expected value. The conductivity of the conductive media 114, 116 may be calculated, but this may be sensitive to the vertical orientation of the device. For devices mounted to the bed 112 as in FIGS. 2a and 2c, this does not cause a problem as the vertical orientation is constant.

Figure 13:
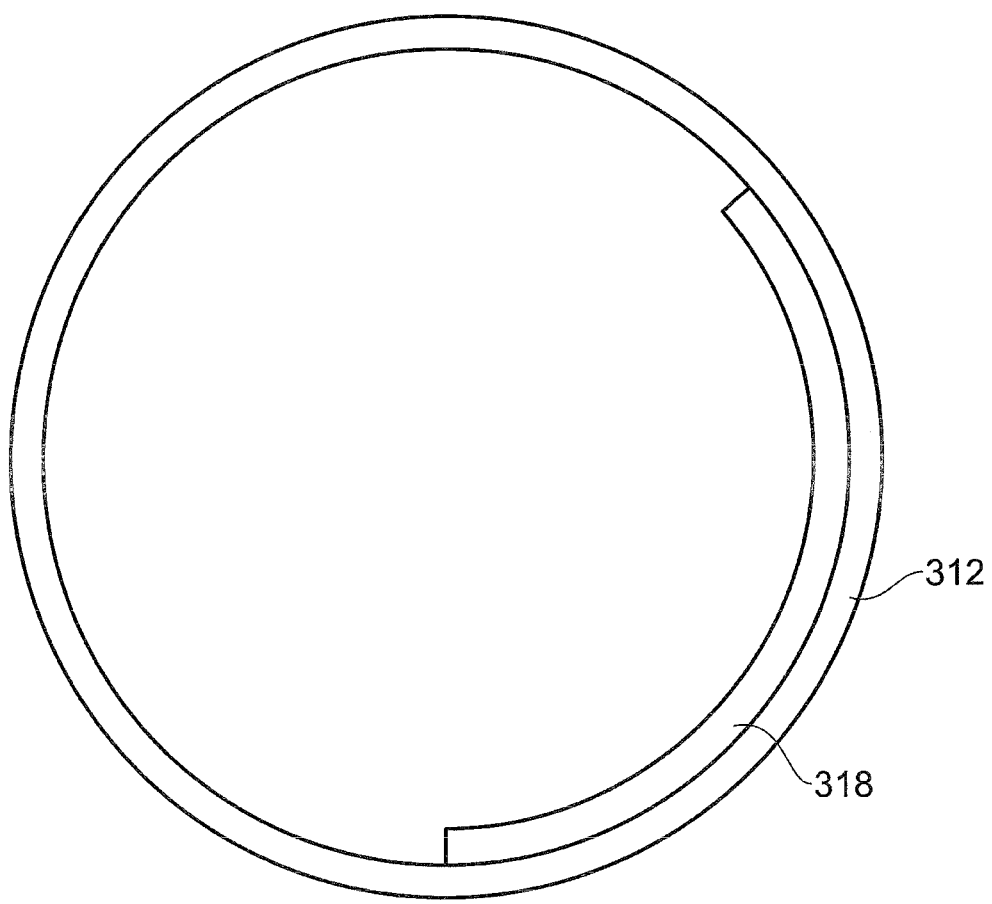
FIG. 13 shows a further embodiment within a pipe.

A further embodiment relating to inspection devices which are pushed down through the flow and sediment layers is shown in FIG. 2b. The orientation includes a horizontal lower edge to improve accuracy by keeping the device vertical. Another embodiment is shown in FIG. 13, where the conductivity profiler 318 is positioned on or incorporated within the inner surface of the pipe or channel 312.

The electronic circuitry (not shown) includes a multiplexer that is used to automatically select a particular two of the electrodes in the array and apply a potential difference (or alternatively, a signal) across the two selected electrodes. The multiplexer further includes the capability of moving along the array of electrodes in a specified sequence. The pairwise nature of applying a potential difference (or signal) across two electrodes avoids unwanted affects associated with interference and possible electroplating around the conductive wires.

Selecting the electrodes may be carried out sequentially in various different orders such as selecting neighbouring pairs and applying a potential difference across then, or by selecting pairs of alternate electrodes or by selecting every $n^{th}$ electrode where n=1, 2, 3. Where the array comprises both electrodes of monotonically increasing lengths and electrodes of decreasing lengths, the two outermost electrodes may be selected followed by consecutive electrode pairs working inwards along the array. This sequence may be useful for averaging local variations in the depths of sediment and flow along the array.

Some of the embodiments of the present invention may be used to identify different properties of sediment and fluid in pipes and channels and in other applications. The conductivity or capacitance of a material may be used to infer the compositions of mechanical structure of the material.

Figure 14:
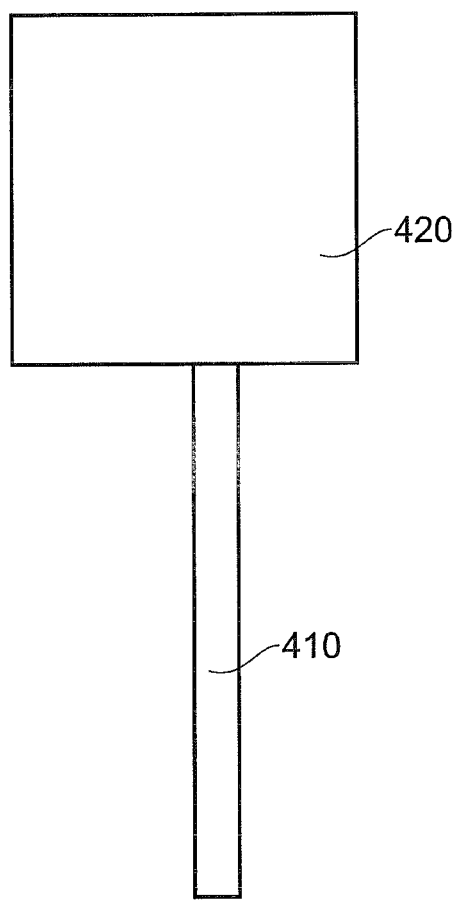
FIG. 14 shows a motorised probe.

FIG. 14 shows an alternative embodiment including a probe 410 and a motor 420. The probe includes at least one electrode and as such may be operated in conductance mode (wherein the conductivity between two electrodes is measured) or in capacitance mode (wherein the capacitance between an electrode and the surrounding media is measured) or any other mode based on the measurement of any other electrical property influenced by the surrounding media. The probe is provided with electronic circuitry to apply a potential to the electrode or alternatively between the electrodes depending on which mode the probe is being operated in. The probe is coupled with a motor adapted to drive the probe into the at least one conductive media at a predetermined rate. By measuring and recording the conductance or capacitance over time, a conductivity or capacitance profile can be produced providing a measure of depths of the at least one conductive media. This produces the same result as the array of probes of incremented length. The array of different length probes is effectively distributed in time rather than space, but yields the same data as the spatially distributed array. The resolution is hence a function of the sample rate and drive velocity. The probe may be driven into the conductive media repeatedly at the predetermined rate, allowing changes in the conductivity or capacitance profile to be monitored.

In some embodiments, adjacent electrodes are energised as an electrode pair (e.g. electrode 1 is paired with the adjacent electrode, electrode 2, and electrode n is paired with the adjacent electrode, electrode n+1). It is also possible to conduct measurements using different electrode separations, (e.g. 1-3, 2-4, 3-5 etc. or 1-4, 2-5, 3-6 etc.). The spacing between the electrode pair is related to the distance normal to the device that the electric field permeates. In this manner, differences in conductivity/capacitance/other electrical properties detected using different electrode spacing may be used to detect boundaries in the direction normal to the plane of the device. This could be used for example to monitor the growth of biofilm on the edge of the pipe or channel in the location that the device is deployed.

The device may also be used to detect conductivity (or another electrical property) boundaries in the direction perpendicular to the device. This enables the detection of the growth of bio-film, or simply the sediment deposit if for example the device is deployed parallel to the sediment-water interface rather than normal to it. Such measurements are achieved by comparing measurements taken with electrode pairs having varying separation. The device typically energises adjacent electrodes as an electrode pair (e.g. electrode pair referenced by electrode 1 and electrode 2, electrode 2 and electrode 3, and electrode 3 and electrode 4). It is also possible to conduct measurements using different electrode separations, (e.g. electrode 1 paired with electrode 3, electrode 2 paired with electrode 4, or electrode 1 paired with electrode 4). It should be appreciated that the aforementioned electrode pair choices are examples from many, and are not deemed to be limiting in any way.

Where the separation of the electrodes in the electrode pair is greater, the conductance (or other electrical property) is reduced by a constant factor. As such, the shape of the measured conductivity profile (or measured profile using another electrical property) is unchanged by variation of the separation of the electrode (e.g. the intersections representing boundaries). The overall values are therefore varied by a constant factor.

Figure 15:
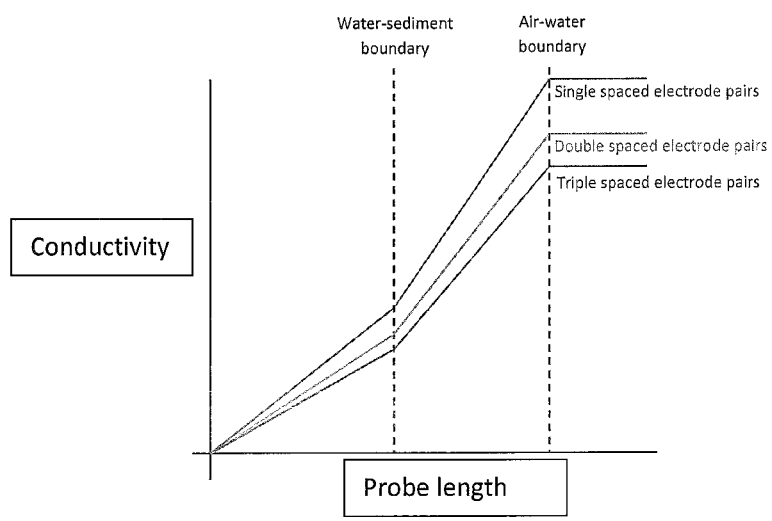
FIG. 15 shows the reduced conductivity profile as a result of increasing electrode separation in each pair.

If the constant factor is A for the double spaced pairs (electrodes 1-3, 2-4, 3-5 etc.), where A is equal to the conductivity profile measured using electrode pairs 1-2, 2-3, 3-4 divided by the conductivity profile measured using pairs 1-3, 2-4, 3-5. This value of A is determined when there are no nearby conductivity boundaries in the direction normal to the plane of the device as shown in FIG. 15.

Figure 16:
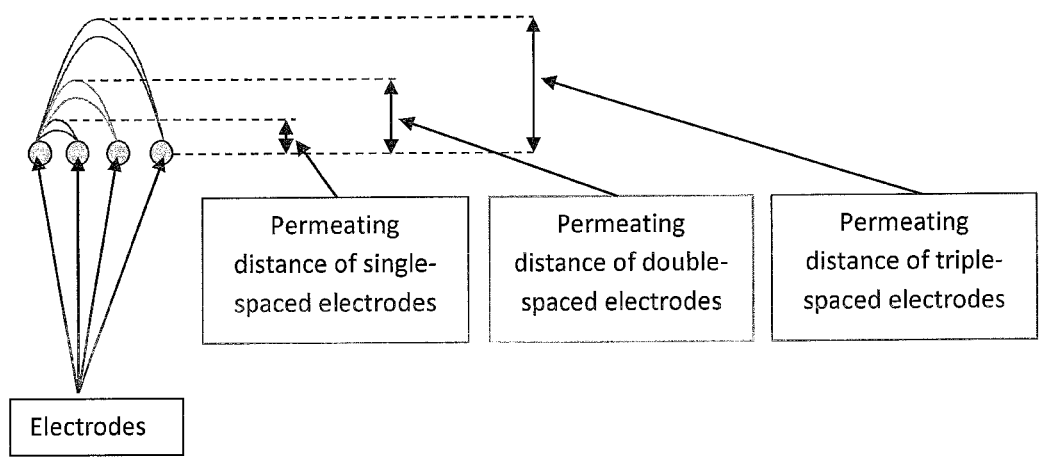
FIG. 16 shows the permeating distance of the electrical field around single, double and triple spaced electrode pairs.

FIG. 16 shows how the spacing between the electrode pair also governs how the electric field permeates in this surrounding media i.e. the distance normal to the electrodes.

Figure 17:
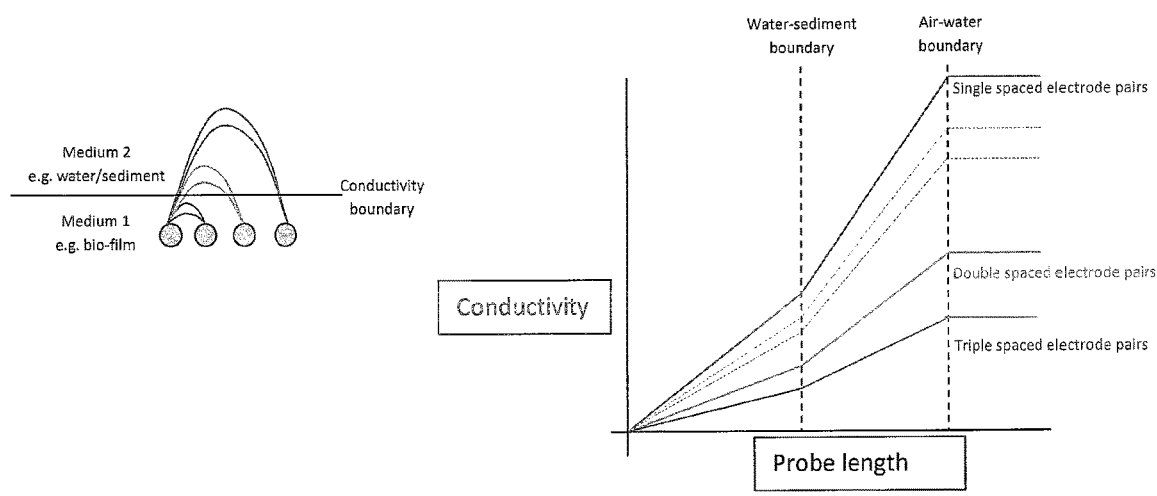
FIG. 17 shows the result of a conductivity boundary existing between the permeating depths of single and double spaced electrode pairs where the boundary is detected because the profiles measured for double and triple spaced electrode pairs differ from the case of no boundary in a direction normal to the device (i.e. the dotted lines).

FIG. 17 shows how a detected change in the value of A corresponds to detected conductivity boundary in a plane parallel with the plane formed by the array of electrodes of the device. This is because the conductivity boundary is located outside the permeating distance of single spaced electrodes, but within the permeating distance of double-spaced electrodes.

Using the device in this manner may also be used to monitor growth of a bio-film. The triple spaced electrodes also have a constant factor associated with them where B is equal to the conductivity profile measured using electrode pairs 1-2, 2-3, 3-4 divided by the conductivity profile measured using pairs 1-4, 2-5, 3-6. If there is no change to the value of A, but there is a change to the value of B, then the conductivity boundary must lie between the permeating distances of the double spaced and triple spaced electrode pairs as shown in FIG. 18.

Figure 19:
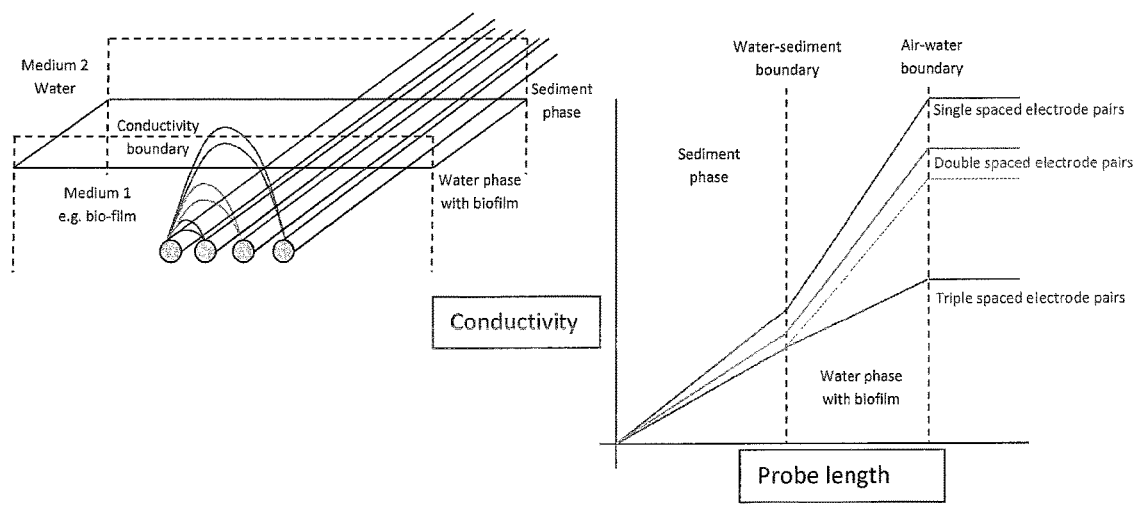
FIG. 19 shows the result of a conductivity boundary existing between the permeating depths of double and triple spaced electrode pairs where the boundary is detected since the profile measured for triple spaced electrode pairs differs from the case of no boundary in the direction normal to the device (the dotted line). The boundary is seen to exist only in the water phase as this line is affected but the line in the sediment phase is not.

FIG. 19 is a three-dimensional representation of the bio-film growing across the electrodes.

Figure 18:
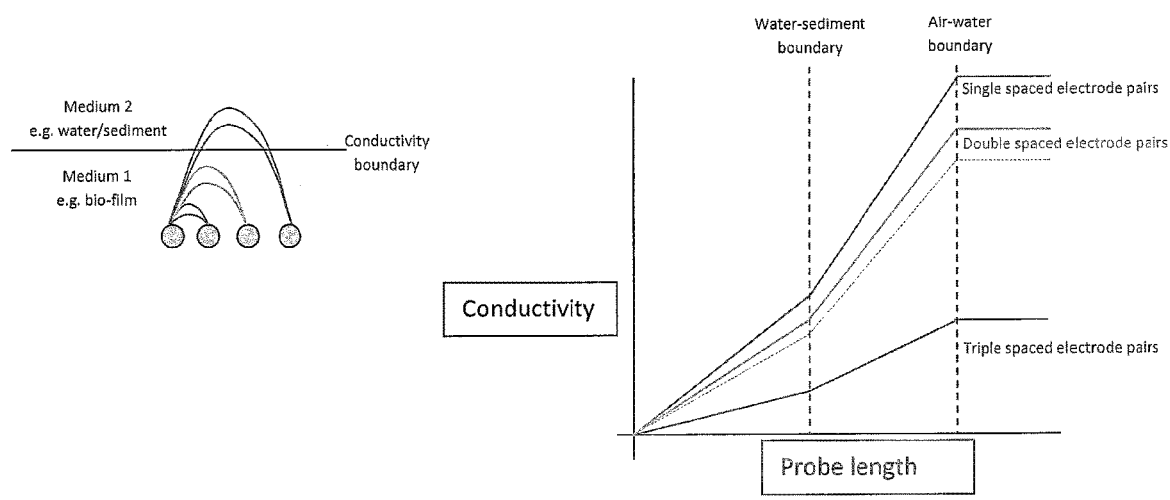
FIG. 18 the result of a conductivity boundary existing between the permeating depths of double and triple spaced electrode pairs where the boundary is detected because the profile measured for triple spaced electrode pairs differs from the case of no boundary in the direction normal to the device (i.e. the dotted line).

FIGS. 17, 18 and 19 assume that the conductivity boundary exists along the entire length of the electrode array which is appropriate for many case especially in bio-film growth. However, there may be situations where a bio-film (or sediment) does not grow uniformly across the entire array. In certain situations, the difference in factors A and/or B may be limited to a particular region, for example, a bio-film growing in the water phase but not growing in the sediment phase. In such a situation, the change in factors A and/or B for different regions of the conductivity (or otherwise) profile would indicate the region in which the bio-film is growing.

In some situations the bio-film may be more conductive than water or it may be less and this will depend upon the properties of the bio-film.

Embodiments of the invention are therefore capable of at least measuring:

The position of abrupt conductivity (or other property) boundaries corresponding to interfaces between different phases, whether they be air, water, oil, sediment, and hence the flow depth, and sediment depth. This measurement is not affected by any change in conductivity (or measured property) of the media and requires no calibration. Furthermore, the embodiments have minimal obstruction to flow, therefore give a true reading of sediment deposition.

Gradual conductivity (or other measured property) changes across a particular phase, for example transitionally coarse sediment depositions, or areas of flow with non-uniform sediment suspensions.

Precise conductivity (or other measured property) values for a given phase over time to indicate the presence of pollutants, suspended particles or organic matter.

Local gradient of sediment deposition/erosion which may indicate particular transportation mechanisms.

May also be used to provide a useful soil probe to identify the sediment composition by comparing measured conductivities and capacitances (or other measured property) of a medium with those values of known materials.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A device for determining depth of at least one conductive medium, the device comprising:

an array of uniformly spaced, elongate, substantially parallel probes, each probe having one electrode or a pair of electrodes, the probes having lengths that are stepwise incrementally increased across the array from a shortest probe to a longest probe for immersion into the at least one conductive medium, the electrodes being exposed along their length for electrical contact with the at least one conductive medium, and electronic circuitry configured to measure a conductivity response of the array as a function of electrode length by applying a potential difference between selected pairs of electrodes having the same separation and measuring a resulting conductivity of the at least one conductive medium between the respective electrodes of each selected pair of electrodes, wherein the electronic circuitry is configured to analyse the measured conductivity response by fitting a linear regression line of each linear region of the measure conductivities response, and determining the relative immersion depth of an or each boundary of the at least one conductive medium by identifying intersections between adjacent linear regions.

2. The device of claim 1, wherein the lengths of the probes of the array increase monotonically.

3. The device of claim 1, wherein the lengths of the probes vary in regular intervals.

4. The device of claim 1, wherein the electrodes are on a curved substrate.

5. The device of claim 1, wherein a potential difference is applied between adjacent electrodes.

6. The device of claim 1, wherein a potential difference is applied between electrodes or probes that have substantially similar lengths.

7. The device of claim 1, wherein the electronic circuitry includes a multiplexer that is selects pairs of the electrodes in the array and applies a potential difference between the two selected electrodes in a predetermined sequence.

8. The device of claim 1, wherein the electronic circuitry is configured to apply a square or sine wave alternating potential difference between any two electrodes selected from the array.

9. The device of claim 8, wherein the frequency of the square wave ranges from about 1 Hz to about 10000 Hz.

10. The device of claim 1, wherein the electronic circuitry is configured to determine the gradient of each linear region.

11. A method of measuring a conductivity profile of at least one conductive medium, comprising:

immersing within the at least one conductive medium an array of uniformly spaced, elongate, substantially parallel probes, each probe having one electrode or a pair of electrodes, the probes having lengths that are stepwise incrementally increased across the array from a shortest probe to a longest probe, the electrodes being exposed along their length for electrical contact with the at least one conductive medium;

measuring a conductivity response of the array as a function of electrode length by applying a potential difference between selected pairs of electrodes and measuring a resulting conductivity of the at least one conductive medium between the respective electrodes of each selected pair of electrodes; and analyzing the measured conductivity response by fitting a linear regression line to each linear region of the measured conductivities response, and determining the relative immersion depth of an or each boundary of the at least one conductive medium by identifying intersection between adjacent linear regions.

12. The method of claim 11, comprising positioning the array of electrodes perpendicular to a flow of water on a river bed wherein mediums of different electrical properties are present and measuring the respective depths of different media.

13. The method of claim 11, comprising positioning the array of electrodes perpendicular to a flow of sea water on a tidal beach wherein mediums of different electrical properties are present, and measuring the change to a position of a sea water-sea bed interface.

* * * * *

UNITED STATES PATENT AND TRADEMARK OFFICE
CERTIFICATE OF CORRECTION

PATENT NO. : 9,939,306 B2
APPLICATION NO. : 14/420909
DATED : April 10, 2018
INVENTOR(S) : Andrew Nichols Page 1 of 1

It is certified that error appears in the above-identified patent and that said Letters Patent is hereby corrected as shown below:

In the Specification (Detailed Description), Column 11, Line 36: Replace "$V_i$ $(V/d)_{water} \times D + (V/d)_{sediment} \times h$," with --$V_i = (V/d)_{water} \times D + (V/d)_{sediment} \times h$,--

(Detailed Description), Column 11, Line 40: Replace "$V_i$ $(V/d)_{water} \times (L_i - h) + (V/d)_{sediment} \times h$," with --$V_i = (V/d)_{water} \times (L_i - h) + (V/d)_{sediment} \times h$,--

Signed and Sealed this
Fifth Day of February, 2019

Andrei Iancu
*Director of the United States Patent and Trademark Office*